(12) United States Patent
Longbottom (10) Patent No.: US 10,392,870 B2
(45) Date of Patent: Aug. 27, 2019

(54) SYSTEMS AND METHODS OF SECURING AND PROTECTING WELLBORE CONTROL LINES

(71) Applicant: Halliburton Energy Services, Inc., Houston, TX (US)

(72) Inventor: James Robert Longbottom, Magnolia, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 396 days.

(21) Appl. No.: 14/761,396

(22) PCT Filed: May 29, 2013

(86) PCT No.: PCT/US2013/043108
§ 371 (c)(1),
(2) Date: Jul. 16, 2015

(87) PCT Pub. No.: WO2015/122866
PCT Pub. Date: Aug. 20, 2015

(65) Prior Publication Data
US 2015/0337605 A1  Nov. 26, 2015

(51) Int. Cl.
*C09J 7/29* (2018.01)
*E21B 17/00* (2006.01)
(Continued)

(52) U.S. Cl.
CPC .............. *E21B 17/026* (2013.01); *C09J 7/29* (2018.01); *E21B 17/003* (2013.01); *E21B 19/00* (2013.01);
(Continued)

(58) Field of Classification Search
CPC ...... E21B 17/023; E21B 47/01; E21B 47/011; E21B 17/1035; E21B 17/003;
(Continued)

(56) References Cited

U.S. PATENT DOCUMENTS 3,112,233 A    11/1963  Friedman et al.
4,194,031 A *   3/1980  Cullum ............... E21B 17/1085
                                                138/109
(Continued)

FOREIGN PATENT DOCUMENTS

DE       20121262 U1   6/2002
EP        2172619 A1   4/2010
WO        9925949 A2   5/1999

OTHER PUBLICATIONS

Supplementary Partial European Search Report completed Oct. 25, 2016 in EP13900856.
(Continued)

*Primary Examiner* — Nicole Coy
(74) *Attorney, Agent, or Firm* — Benjamin Fite; C. Tumey Law Group PLLC (57) ABSTRACT

Disclosed are systems and method of securing and protecting control lines during run-in into a wellbore with wellbore tape. The wellbore tape includes a substrate having a front surface and a back surface, a wear-resistant coating disposed on at least a portion of the front surface, and an adhesive layer disposed on the back surface, the adhesive layer being configured to affix the substrate to an outer surface of a conveyance.

17 Claims, 3 Drawing Sheets

(51) Int. Cl.
  *E21B 17/02* (2006.01)
  *E21B 19/00* (2006.01)
(52) U.S. Cl.
  CPC ...... *C09J 2201/122* (2013.01); *C09J 2201/16* (2013.01); *C09J 2400/143* (2013.01); *Y10T 428/24802* (2015.01); *Y10T 428/2804* (2015.01); *Y10T 428/2848* (2015.01)
(58) Field of Classification Search
  CPC ........ E21B 17/026; E21B 19/00; C09J 7/026; C09J 7/0264; C09J 7/0292; C09J 7/0296; C09J 2201/122; C09J 2201/16; C09J 2400/143; Y10T 428/24802; Y10T 428/2804; Y10T 428/2848
  See application file for complete search history.

(56) References Cited

U.S. PATENT DOCUMENTS

| | | | |
|---|---|---|---|
| 5,702,994 A * | 12/1997 | Klosel | B32B 15/08 428/344 |
| 6,507,686 B1 * | 1/2003 | Heinz | G02B 6/508 138/103 |
| 9,273,520 B2 * | 3/2016 | O'Blenes | E21B 19/22 |
| 2002/0154028 A1 | 10/2002 | Beique et al. | |
| 2007/0169929 A1 * | 7/2007 | Hall | E21B 17/003 166/65.1 |
| 2007/0196610 A1 | 8/2007 | O'Rourke et al. | |
| 2008/0187276 A1 * | 8/2008 | Roberts | G02B 6/3608 385/114 |
| 2011/0220348 A1 | 9/2011 | Jin et al. | |
| 2011/0240163 A1 * | 10/2011 | Auzerais | E21B 17/1035 138/103 |
| 2012/0238172 A1 | 9/2012 | Siebert et al. | |
| 2016/0177638 A1 * | 6/2016 | O'Blenes | E21B 19/22 166/53 |

OTHER PUBLICATIONS

International Search Report and Written Opinion for PCT/US2013/043108 dated Aug. 27, 2015.

* cited by examiner

SYSTEMS AND METHODS OF SECURING AND PROTECTING WELLBORE CONTROL LINES

BACKGROUND

The present disclosure relates to wellbore operations and, more particularly, to securing and protecting control lines during run-in into a wellbore.

In the oil and gas industry, strings of pipe are typically run into a wellbore at various times during the creation and completion of a well. A wellbore is formed for example, by running a bit on the end of the tubular string of drill pipe. Later, larger diameter pipe is run into the wellbore and cemented therein to line the well and isolate certain parts of the wellbore from other parts. Smaller diameter tubular strings are then run through the lined wellbore either to form a new length of wellbore therebelow, to carry tools into the well, or to serve as a conduit for hydrocarbons gathered from the well during production operations.

Some of the tools that are run into the wellbore are used for remote operation or communication in the downhole environment. Some of these tools are operated mechanically by causing one part to move relative to another. Others are operated using natural forces like differentials between downhole pressure and atmospheric pressure. Others are operated hydraulically by adding pressure to a column of fluid in the tubular above the tool. Still others need a control line to provide either a signal, power, or both in order to operate the device or to serve as a conduit for communications between the device and the surface of the well. Control lines, also known as umbilical cords, can provide electrical, hydraulic, or fiber optic means of signal transmission, control, and power into the downhole environment.

Because the interior of a tubular string is generally kept clear for movement of fluids and other devices therein, control lines are most typically run into the well along the outer surface of the tubular string. For example, a tubular string may be formed at the surface of a well and, as it is progressively inserted into the wellbore, a control line may be introduced into the wellbore simultaneously with the tubular string. The control line is typically provided from a reel or spool somewhere near the surface of the well and extends along the tubular string to some component attached to the string. Because of the harsh conditions and non-uniform surfaces in the wellbore, control lines are typically fixed to the tubular string along is entire length to keep the line and the tubular string together and prevent the control line from being damaged or pulled away from the tubular string during its trip into the well.

Control lines are typically attached to the tubular strings using clamps placed at predetermined intervals along the length of the tubular string by an operator. These clamps are usually metal or polymeric protectors that mechanically bolt, clamp, or otherwise fasten the control line to the tubular. These bolt-on protectors, however, are expensive and bulky, and several different sizes of protectors may need to be on-hand on the rig floor to accommodate varying changes in tubular diameter. Moreover, such bolt-on protectors can require several assembly tools that further complicate the process of attaching control lines to the tubular strings.

SUMMARY OF THE DISCLOSURE

The present disclosure relates to wellbore operations and, more particularly, to securing and protecting control lines during run-in into a wellbore.

In some embodiments, a wellbore tape is disclosed and may include a substrate having a front surface and a back surface, a wear-resistant coating disposed on at least a portion of the front surface, and an adhesive layer disposed on the back surface, the adhesive layer being configured to affix the substrate to an outer surface of a wellbore conveyance and remain adhered to the wellbore conveyance in a wellbore environment.

In other embodiments, a well system is disclosed and may include a conveyance extendable into a wellbore, at least one control line extending externally to the conveyance, and a length of wellbore tape wrapped at least partially around the conveyance and attaching the at least one control line thereto, the wellbore tape including a substrate having a front surface with a wear-resistant coating disposed on at least a portion thereof and a back surface with an adhesive layer disposed thereon, and the adhesive layer being configured to affix the substrate to an outer surface of the conveyance and remain adhered to the wellbore conveyance in a wellbore environment.

In yet other embodiments, a method is disclosed that may include introducing a wellbore conveyance into a wellbore, arranging at least one control line external to the wellbore conveyance, and attaching the at least one control line to the wellbore conveyance with a length of wellbore tape wrapped at least partially around the wellbore conveyance, the wellbore tape including a substrate having a front surface with a wear-resistant coating disposed on at least a portion thereof, and a back surface with an adhesive layer disposed thereon.

The features of the present disclosure will be readily apparent to those skilled in the art upon a reading of the description of the embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure relates to wellbore operations and, more particularly, to securing and protecting control lines during run-in into a wellbore.

The systems and methods disclosed herein provide a low-cost and efficient means of securing control lines to wellbore conveyances being run downhole, and simultaneously protecting the control lines from damage during run-in. In particular, disclosed is a wellbore tape that may be coated with, or otherwise have affixed thereto, an abrasion- or wear-resistant material. The wellbore tape may be wrapped at least partially around a wellbore conveyance, thereby securing a control line to the wellbore conveyance and simultaneously providing protection to the control line as the wellbore conveyance is introduced downhole. The wellbore tape is not dependent on tubing size, coupling length, the number of control lines, or the tubing material or type, and therefore may prove advantageous from a standardized inventory perspective. Moreover, the time required to install the wellbore tape may be drastically shorter than traditional bolt-on clamping systems, thereby saving valuable rig time. The wellbore tape may prove particularly advantageous in lower-cost, low-tech well installations such as unconventional wells requiring chemical injection, artificial lift, or operations for attaching additional control lines to existing tubing or power cables.

Figure 1:
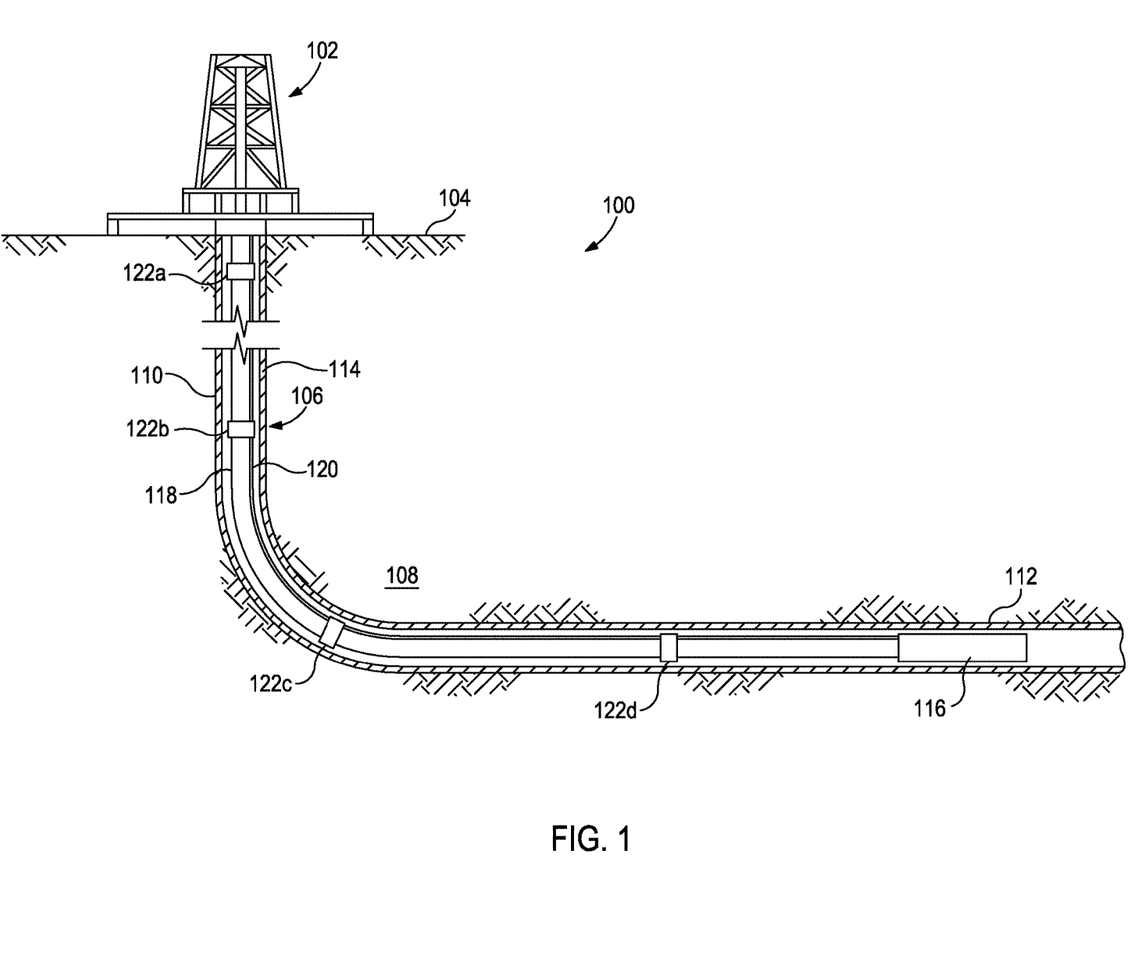
FIG. 1 illustrates a exemplary well system that may employ one or more principles of the present disclosure, according to one or more embodiments.

Referring to FIG. 1, illustrated is a well system 100 that may embody or otherwise employ one or more principles of the present disclosure, according to one or more embodiments. As illustrated, the well system 100 may include a service rig 102 that is positioned on the earth's surface 104 and extends over and around a wellbore 106 that penetrates one or more subterranean formations 108. The service rig 102 may be a drilling rig, a completion rig, a workover rig, or the like. In some embodiments, the service rig 102 may be omitted and replaced with a standard surface wellhead completion or installation. Moreover, while the well system 100 is depicted as a land-based operation, it will be appreciated that the principles of the present disclosure could equally be applied in any sea-based or sub-sea application where the service rig 102 may be a floating platform or sub-surface wellhead installation, as generally known in the art.

The wellbore 106 may be drilled into the subterranean formation 108 using any suitable drilling technique and may extend in a substantially vertical direction away from the earth's surface 104 over a vertical wellbore portion 110. At some point in the wellbore 106, the vertical wellbore portion 110 may deviate from vertical relative to the earth's surface 104 and transition into a substantially horizontal wellbore portion 112. In some embodiments, the wellbore 106 may be completed by cementing a casing string 114 within the wellbore 106 along all or a portion thereof.

The system 100 may further include a downhole tool 116 configured to be conveyed into the wellbore 106 in order to perform one or more wellbore operations. As illustrated, the downhole tool 116 may be conveyed into the wellbore 106 as coupled or otherwise attached to a wellbore conveyance 118 that extends from the service rig 102. The conveyance 118 may be, but is not limited to, drill string or pipe, production tubing or pipe, coiled tubing, chemical injection lines, power cables, or any other rigid or semi-rigid tubular or string of tubulars that can be inserted into the wellbore 106.

One or more control lines 120 may be coupled or otherwise attached to the outer surface of the conveyance 118 as it is being introduced into the wellbore 106. Although only one control line 120 is depicted in FIG. 1, it will be appreciated that any number of control lines 120 may be attached to the exterior of the conveyance 118, without departing from the scope of the disclosure. The control line 120 may be representative of or otherwise include one or more hydraulic lines, one or more electrical lines, one or more fiber optic lines, or other types of control lines known to those skilled in the art. Accordingly, the term "control line" as used herein may broadly refer to any tubular structure or line coupled to the exterior of the conveyance 118.

As illustrated, the control line 120 may extend externally to the conveyance 118 until being communicably coupled to the downhole tool 116 at its distal end. The control line 120 may be configured to communicably couple the downhole tool 116 to the service rig 102, such that power may be provided to various downhole equipment associated with the downhole tool 116. The control line 120 may also be used as a bi-directional communication line configured to convey command signals and otherwise transmit data between the downhole tool 116 and the service rig 102.

According to embodiments of the present disclosure, the control line 120 may be coupled or otherwise attached to the exterior of the conveyance 118 using a wellbore tape 122. The wellbore tape 122 may be installed on the conveyance 118 at the service rig 102 by rig hands or other workers as the conveyance 118 is introduced systematically into the wellbore 106. The wellbore tape 122 may be installed at several locations along the axial length of the conveyance 118 in order to attach the control line 120 to the conveyance 118 at corresponding discrete locations. For example, the wellbore tape 122 is depicted in FIG. 1 as wellbore tape 122a, 122b, 122c, and 122d. In some embodiments, the respective locations of the wellbore tape 122a-d may be spaced at predetermined distances from each other. In other embodiments, the locations of the wellbore tape 122a-d may be spaced randomly, without departing from the scope of the disclosure. In at least one embodiment, the wellbore tape 122a-d may be installed on the conveyance 118 once or twice per joint of the conveyance 118.

Installing the wellbore tape 122 may include wrapping or otherwise extending the wellbore tape 122 around at least a portion of the outer circumferential surface of the conveyance 118 and simultaneously capturing a portion of the control line 120 at that particular location. As discussed below, the wellbore tape 122 may be adhered to or otherwise stuck to the outer surface of the conveyance 118 as it is wrapped. Moreover, the wellbore tape 122 may have an abrasion- or wear-resistant coating or material applied to its outer surface which may serve to protect the control line 120 from abrasion or damage as the conveyance 118 is introduced downhole. Accordingly the wellbore tape 122 is configured to be installed in a short time frame on the floor of the service rig 102 and provide protection to the control line 120.

Figure 2A:
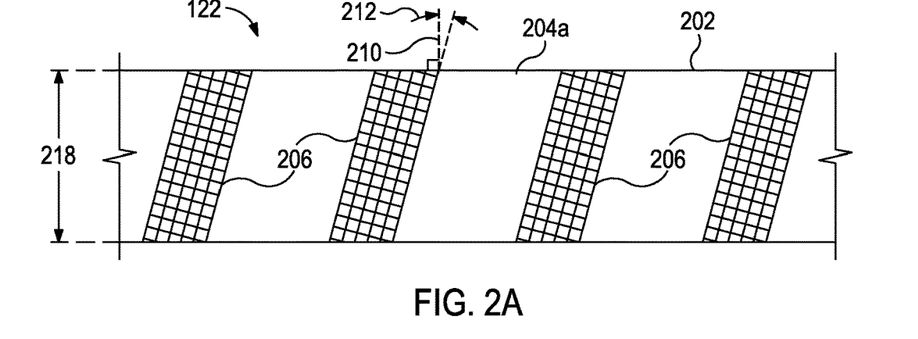
FIGS. 2A and 2B illustrate a length of exemplary wellbore tape, according to one or more embodiments.
Figure 2B:
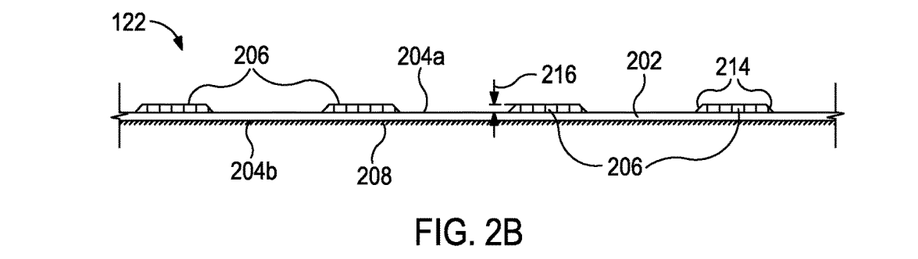

Referring now to FIGS. 2A and 2B, with continued reference to FIG. 1, illustrated is a length of exemplary wellbore tape 122, according to one or more embodiments. In particular, FIG. 2A illustrates a top view of the exemplary wellbore tape 122 and FIG. 2B illustrates a side view of the exemplary wellbore tape 122. While only a short length or portion of the wellbore tape 122 is shown, it will be appreciated that the wellbore tape 122 may extend in either direction (i.e., to the left and/or right in FIGS. 2A and 2B) to lengths depending at least partially on cost and manufacturing capabilities.

As illustrated, the wellbore tape 122 may include a substrate 202 having a front surface 204a and a back surface 204b. A wear-resistant coating 206 may be disposed on or otherwise applied to all or a portion of the front surface 204a and an adhesive layer 208 may be disposed on or otherwise applied to the back surface 204b. The substrate 202 may be made of a variety of materials and/or compositions including, but not limited to, plastics or polymers, composites, elastomers, woven fabrics, metal foils, combinations thereof, and the like. In some embodiments, the material of the substrate 202 may be cured to a hardened or rigid state after or while the wellbore tape 122 is being applied to the conveyance 118. In such embodiments, curing of the substrate 202 may be accomplished through the application of at least one of ultraviolet radiation, electron beam radiation, a chemical catalyst, or heat in order to help facilitate the hardening process.

Suitable plastics or polymers that may be used for the substrate 202 include, but are not limited to, polyamides, polyimides, acetal copolymers, polybenzimidazoles, polyetheretherketones (PEEK), polyetherimides, nylons, polyesters, polysulphones, polyphenylenesulphones, polyphenylene sulphides, acrylate polymers, acrylic resins, polymethylmethacralytes, polycarbonates, polyvinylchlorides (PVC), polyviylidenefluorides, polytetrafluoroethylenes (PTFE), polyethylenes, polypropylenes, glass epoxies, glass silicones, epoxy resins, phenol resins, polybenzoimidazole resins, benzoxazine resins, cyanate ester resins, unsaturated polyester resins, vinyl ester resins, urea resins, melamine resins, bismaleimide resins, polyimide resins and polyamideimide resins, polyolefin resins, styrene-based resins, polyoxymethylene resin, polyamide resins, polyurethane resins, polyurea resins, polydicyclopentadidene resin, polycarbonate resins, polymethylene methacrylate resin, polyetherimide resins, polysulfone resins, polyallylate resins, polyether sulfone resins, polyketone resins, polyether ketone resins, polyether ether ketone resins, polyether ketone ketone resins, polyarylate resins, polyether nitrile resins, polyimide resins, polyamideimide resins, phenol resins, phenoxy resins, fluorine-based resins such as polytetrafluoroethylene resin, elastomers (e.g., butadiene acrylonitrile, its carboxylic acid or amine modification products, fluoroelastomers, polysiloxane elastomers), rubbers (butadiene, styrene butadiene, styrene butadiene styrene, styrene isoprene styrene, natural rubber, etc.), resins for RIM (e.g., those containing a catalyst or the like capable of forming polyamide 6, polyamide 12, polyurethane, polyurea or polycicyclopentadiene), cyclic oligomers (those containing a catalyst or the like capable of forming a polycarbonate resin, polybutylene terephthalate resin, etc.), the copolymers and modification products thereof, resins or plastics obtained by blending two or more of the foregoing, and the like.

Suitable composite materials that may be used for the substrate 202 include, but are not limited to, any of the aforementioned plastics or polymers reinforced with carbon fiber, carbon nanotubes, glass fibers, fiberglass, polymer fibers (e.g., KEVLAR®), metal fibers, ceramic fibers, combinations thereof, and the like. The composite materials may be used to not only provide reinforcement to the substrate 202, but also for purposes of thermal or electrical conductivity if need be.

Suitable elastomers that may be used for the substrate 202 include, but are not limited to, natural polyisoprene, synthetic polyisoprene, polybutadiene, chloroprene rubber, polychloroprene, neoprene, baypren, butyl rubber, halogenated butyl rubbers, styrene-butadiene rubber, nitrile rubber (e.g., hydrogenated nitrile rubbers (HNBR) Therban and Zetpol), ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, thermoplastic elastomers, resilin, elastin, polysulfide rubber, combinations thereof, and the like.

Suitable threads or fill yarn for woven fabrics that may be used for the substrate 202 include, but are not limited to, cotton, polyester, nylon, rayon, fiberglass, combinations thereof, and the like.

The wear-resistant coating 206 may also be made of a variety of materials or compositions including, but not limited to, ceramics, elastomers, plastics or polymers, metals, glass beads, crystalline materials (natural or manmade), combinations thereof, and the like. Suitable elastomers that may be used for the wear-resistant coating 206 are substantially similar to those materials suitable for the substrate 202 and therefore will not be listed again. Similarly, suitable plastics or polymers that may be used for the wear-resistant coating 206 are substantially similar to those materials suitable for the substrate 202 and therefore will also not be listed again.

In some embodiments, where metal is used as the wear-resistant coating 206, the metal material may be impregnated with oil or another lubricant such that the wear-resistant coating 206 may exhibit a degree of lubricity and otherwise reduce friction. Similarly, the use of elastomers as the wear-resistant coating 206 may prove advantageous since fluids encountered in the wellbore 106 may develop thin fluid films on the wear-resistant coating 206 that may serve to reduce friction. In some embodiments, any of the materials used for the wear-resistant coating 206 may be coated or otherwise impregnated with TEFLON® in order to reduce friction.

The adhesive layer 208 may encompass any known adhesive or adhesive system including, but not limited to, natural rubber-based adhesives, synthetic rubber-based adhesives, silicone adhesives, polyacrylate adhesives, pressure-sensitive adhesives, solvent based adhesives, polymer dispersion adhesives, contact adhesives, reactive adhesives, heat activated adhesives, combinations thereof, and the like. Similar to the substrate 202, the adhesive layer 208 may optionally be cured to a hardened or rigid state after or while the wellbore tape 122 is being applied to the conveyance 118. Curing of the adhesive layer 208 may be accomplished through the application of at least one of ultraviolet radiation, electron beam radiation, a chemical catalyst, or heat. In other embodiments, the adhesive layer 208 may be omitted from the wellbore tape 122 altogether. Instead an adhesive or glue may be applied directly to the outer surface of the conveyance 118 and the substrate 202 may be applied to the adhesive, without departing from the scope of the disclosure. The adhesive or adhesive system that makes up the adhesive layer 208 may be configured to remain adhered to a wellbore conveyance 118 or control line 120 when exposed to downhole wellbore environments which may exhibit elevated temperatures and pressures.

The wear-resistant coating 206 may be bonded to the front surface 204a of the substrate 202 using one or more of the adhesives listed above with reference to the adhesive layer 208. In some embodiments, the wear-resistant coating 206 may be applied to the entire front surface 204a of the substrate 202. In other embodiments, however, the wear-resistant coating 206 may be applied to the front surface 204a in sections, portions, or strips, without departing from the scope of the disclosure. Applying the wear-resistant coating 206 in sections, portions, or strips may prove advantageous in reducing material and manufacturing costs of the wellbore tape 202.

As illustrated in FIGS. 2A and 2B, the wear-resistant coating 206 may be applied to the front surface 204a of the substrate 202 in laterally-spaced strips or portions (i.e., four strips shown). In some embodiments, each strip of wear-resistant coating 206 may be equidistantly spaced from each other. In other embodiments, the strips of wear-resistant coating 206 may be randomly spaced from each other along the length of the wellbore tape 122, without departing from the scope of the disclosure.

In some embodiments, one or more of the strips of the wear-resistant coating 206 may be arranged orthogonal 210 to the lateral edges of the wellbore tape 202 (i.e., the upper and lower edges of the substrate 202 as seen in FIG. 2A). In other embodiments, however, as depicted in FIG. 2A, one or more of the strips of the wear-resistant coating 206 may be arranged at an angle 212 slightly offset from orthogonal 210, without departing from the scope of the disclosure. The angle 212 may range anywhere from a few degrees to several degrees offset from orthogonal 210. For instance, the angle 212 may be about 1°, about 5°, about 10°, about 20°, or about 45° offset from orthogonal 210, or any angle therebetween. In yet other embodiments, the angle 212 may be more than 45° offset from orthogonal 210.

In the embodiment depicted in FIGS. 2A and 2B, the wear-resistant coating 206 may be made of a ceramic material. In particular, the depicted wear-resistant coating 206 encompasses several small ceramic tiles bonded to the front surface 204a of the wellbore tape 122. The tiles may be small enough such that the wellbore tape 122 is able to wrap around and otherwise generally conform to the circular shape of the conveyance 118. In some embodiments, for example, each ceramic tile may be sized to about 1 mm by about 1 mm, about 5 mm by about 5 mm, about 10 mm by about 10 mm, about 20 mm by about 20 mm, and larger sizes.

In some embodiments, the tiles may be square, as illustrated. In other embodiments, however, one or more of the tiles may exhibit other polygonal shapes (e.g., triangle, rectangle, pentagon, hexagon, heptagon, octagon, etc.) or may exhibit a generally rounded or arcuate shape (e.g., circular, oval, elliptical, crescent, etc.), without departing from the scope of the disclosure. Those skilled in the art will readily appreciate that the respective size and geometry of each ceramic tile may vary depending on several factors including wellbore geometry, geometry of the conveyance, manufacturing costs, and the cost of materials. Accordingly, tiles of any size or geometry are specifically contemplated herein as an integral part of this disclosure.

Referring particularly to FIG. 2B, in some embodiments, one or both of the longitudinal ends 214 of the strips of the wear-resistant coating 206 may be angled or otherwise beveled such that no perceptible edge of the coating 206 is apparent on its lateral edges. Having such beveled ends 214 may prove advantageous in reducing the likelihood that the wear-resistant coating 206 will be caught up on wellbore obstacles, such as locating profiles or other angled surfaces or obstructions, and instead smoothly transition over such obstacles.

The wear-resistant coating 206 may also exhibit a height 216 configured to provide a standoff distance between the casing string 114 (FIG. 1) and the conveyance 118 during run-in. Such a standoff distance may prove advantageous in protecting the conveyance 118 and the control line 120 from detrimental wear against the interior of the casing string 114, especially around curves within the wellbore 106 (FIG. 1) where the diameter of the wellbore 106 often changes and could potentially damage the control line 120. In such cases, the wear-resistance coating 206 may function somewhat like a centralizer, as known by those skilled in the art. In some embodiments, multiple layers of the wellbore tape 122 may be wrapped at a single location, thereby effectively increasing the height 216 of the wear-resistant coating 206.

The particular height 216 of the wear-resistant coating 206 may vary, depending on the application and the particular geometry of the wellbore 106. The height may be about 1 mm, about 5 mm, about 10 mm, about 20 mm, or any measurement therebetween. As will be appreciated, in some embodiments the height 216 may be less than 1 mm or larger than 20 mm, without departing from the scope of the disclosure. As will be appreciated, the height 216 may prove advantageous in preventing direct impact or pinching of the control line 120 by providing a stand-off or radial gap between the inner diameter of the casing string 114 and the outer diameter of the conveyance 118. Consequently, the height 216 may essentially create an effective "safe zone" in which the control line 120 will be held.

Referring again to FIG. 2A, the wellbore tape 122, or the substrate 202, may be manufactured to exhibit a particular width 218. As will be appreciated, the size of the width 218 may depend on material and manufacturing capabilities, but also on the ability for a rig hand to handle and install the wellbore tape 122 effectively. In some embodiments, for example, the width 218 of the wellbore tape 122 may be about 2 inches. In other embodiments, the width 218 of the wellbore tape 122 may be greater or less than 2 inches, such as about 1 inch, about 3 inches, about 5 inches, and greater than 5 inches, without departing from the scope of the disclosure.

Figure 3:
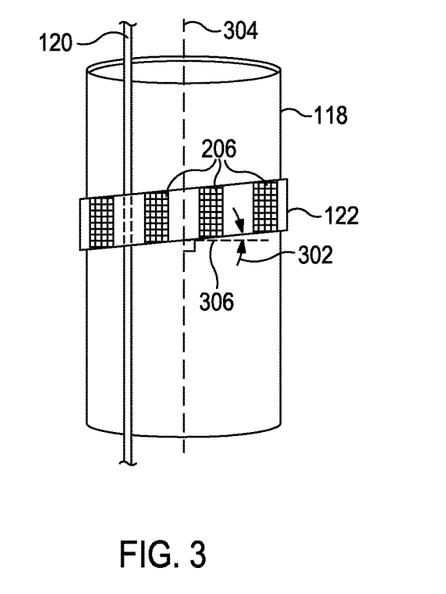
FIG. 3 illustrates an isometric view of a control line as coupled to a conveyance using a length of exemplary wellbore tape, according to one or more embodiments.

Referring now to FIG. 3, with continued reference to FIGS. 1 and 2A-2B, illustrated is an isometric view of a control line 120 as coupled to a portion of the conveyance 118 using a length of the exemplary wellbore tape 122, according to one or more embodiments. Similar to the embodiment shown in FIGS. 2A-2B, the wear resistant coating 206 is applied on the wellbore tape 122 in laterally-spaced strips. As briefly mentioned above, the wellbore tape 122 may extend or wrap around a portion or the entirety of the outer circumferential surface of the conveyance 118 in order to capture the control line 120 and otherwise secure the control line 120 to the conveyance 118. In some embodiments, the wellbore tape 122 may be extended or wrapped around the outer surface of the conveyance and adhered or otherwise affixed to itself using the adhesive layer 208 (FIG. 2B).

In some embodiments, as illustrated, the wellbore tape 122 may be installed on the conveyance 118 at an angle 302 offset from orthogonal 306 to the longitudinal axis 304 of the conveyance 118. Installing the wellbore tape 122 at an angle 302 may prove advantageous by helping to facilitate the external diameter of the wellbore tape 122 to work over any ledges or shoulders, such as small casing lips, upsets, or small debris, within the wellbore 106 as the conveyance 118 is rotated and advanced.

The angle 302 may range anywhere from a few degrees to several degrees offset from orthogonal 306. For instance, the angle 302 may be about 1°, about 5°, about 10°, about 20°, or about 45° offset from orthogonal to the longitudinal axis 304, or any angle therebetween. In yet other embodiments, the angle 302 may be more than 45° offset from orthogonal to the longitudinal axis 304. Those skilled in the art, however, will readily appreciate that the wellbore tape 122 may nonetheless be applied to the conveyance 118 as substantially aligned with orthogonal 306 to the longitudinal axis 304, without departing from the scope of the disclosure. Moreover, in at least one embodiment, the wellbore tape 122 may be applied to the conveyance 118 longitudinally, such as being aligned generally with the longitudinal axis 304.

Figure 4A:
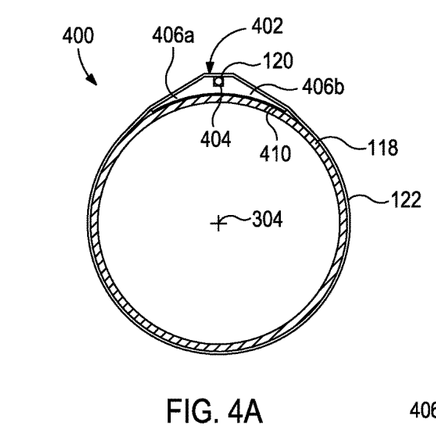
FIG. 4A illustrates a cross-sectional end view of a system for installing exemplary wellbore tape, according to one or more embodiments.
Figure 4B:
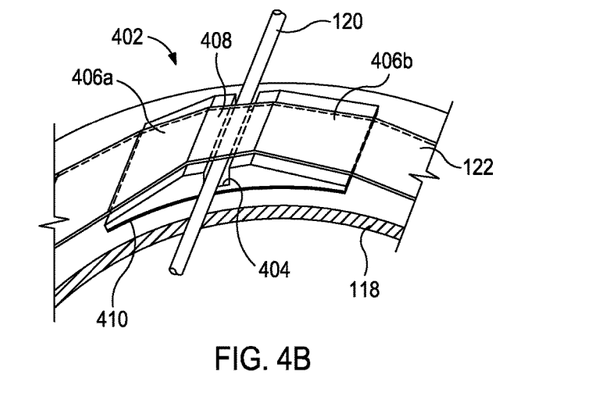
FIG. 4B illustrates an isometric view of a portion of the system of FIG. 4A.
Figure 4C:
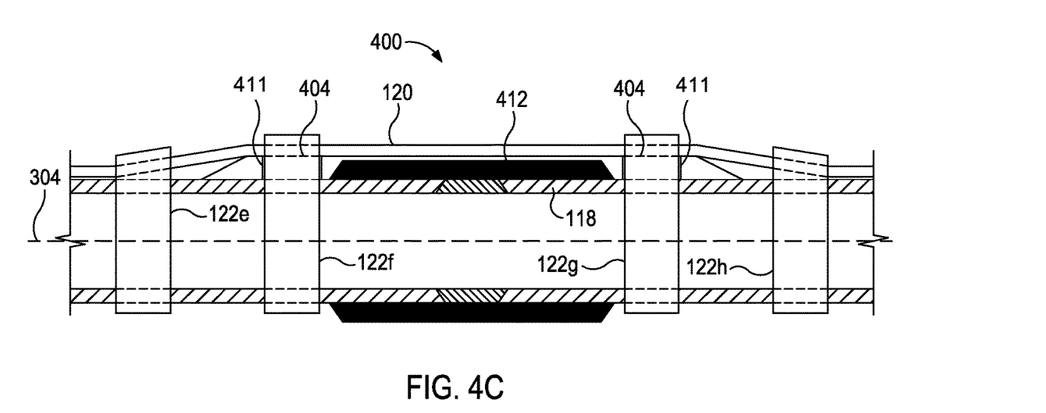
FIG. 4C illustrates an exemplary application of the system of FIG. 4A, according to one or more embodiments.

Referring now to FIGS. 4A-4C, with continued reference to the prior figures, illustrated is an exemplary system 400 for installing the wellbore tape 122, according to one or more embodiments. In particular, FIG. 4A illustrates a cross-sectional end view of the system 400, FIG. 4B illustrates an isometric view of a portion of the system 400, and FIG. 4C illustrates an exemplary application of the system 400, according to one or more embodiments. As depicted in FIG. 4A, the system 400 may include the wellbore tape 122 arranged about the conveyance 118 and a relief insert 402 configured to house or otherwise receive the control line 120. For clarity, the wear-resistant coating 206 applied to the substrate 202 is not shown in FIGS. 4A-4C.

The relief insert 402 may generally be characterized as a ramp-like structure configured to elevate the control line 120 off of the outer surface or outer diameter of the conveyance 118. As best seen in FIG. 4B, the relief insert 402 may define a groove or channel 404 configured to seat the control line 120 as it extends axially along the conveyance 118. The relief insert 402 may define or otherwise provide opposing ramp portions 406a and 406b that lead to a top surface 408 in which the channel 404 may be formed or otherwise defined. The opposing ramp portions 406a,b and the top surface 408 may all be configured to receive and otherwise seat a length of the wellbore tape 122. As depicted, the wellbore tape 122 may be configured to contiguously follow up and back down the ramp portions 406a,b and extend over the top surface 408 to thereby secure the control line 120 within the channel 404 and otherwise prevent its removal therefrom. The ramp portions 406a,b provide a relatively smooth transition for the wellbore tape 122 between the outer surface of the conveyance 118 to the top surface 408 of the relief insert 402.

In some embodiments, the system 400 may further include a vibration dampener 410 arranged between the relief insert 402 and the outer surface of the conveyance 118. The vibration dampener 410 may be made of a variety of materials used to dampen vibrations originating or otherwise propagating in the conveyance 118 and potentially transmittable to the control line 120. Use of the vibration dampener 410 may be configured to reduce or eliminate such damaging vibrations by decoupling the control line 120 from vibrations propagating through the conveyance 118 or substantially changing the vibration frequency. In other aspects, the vibration dampener 410 may be used to provide an added amount of cushion to the control line 120 such that it is less susceptible to being crushed upon being forced against the inner wall of the casing string 114 (FIG. 1) during run-in operations.

Referring particularly to FIG. 4C, one or more relief inserts 411 may be used to elevate the control line 120 off of the outer surface or outer diameter of the conveyance 118, according to one or more embodiments. The relief inserts 411 may be similar in some respects to the relief insert 402 of FIGS. 4A and 4B. For instance, the relief inserts 411 may be used receive and elevate the control line 120 off of the outer diameter of the conveyance 118. Several lengths of wellbore tape 122 are shown in FIG. 4C, depicted as wellbore tapes 122 e, 122 f, 122 g, and 122 h. Again, for clarity the wear-resistant coating 206 of the wellbore tapes 122 e-h is not shown in FIG. 4C, but those skilled in the art will readily appreciate that one or all of the wellbore tapes 122 e-h may have the wear-resistant coating 206 applied thereto.

The first and fourth wellbore tapes 122e and 122h may be applied to the conveyance 118 in a manner substantially similar to the embodiment shown in FIG. 3. Accordingly, the wellbore tapes 122e,h may be wrapped at least partially around the conveyance 118 and secure the control line 120 in close engagement to the outer surface of the conveyance 118.

The second and third wellbore tapes 112f and 122g, however, may each be applied to the conveyance 118 in conjunction with a corresponding relief insert 411, as generally described above. The control line 120 may extend through or otherwise be received within the corresponding channels 404 defined in each relief insert 411. As a result, the control line 120 may be elevated off of the outer circumferential surface of the conveyance 118 and otherwise capable of longitudinally bypassing one or more conveyance obstructions 412 associated with the conveyance 118. In some embodiments, the conveyance obstruction 412 may be a cross coupling that extends radially outward from the outer surface of the conveyance 118. In other embodiments, the conveyance obstruction 412 may be a downhole tool or the like that exhibits an increased outer diameter as compared to the conveyance 118. It will be appreciated that the relief inserts 411 may have varying heights to accommodate the varying radial heights of potential conveyance obstructions 412.

Without properly transitioning the control line 120 from the outer surface of the conveyance 118 to a radial height that matches or exceeds the radial height of the conveyance obstruction 412, the control line 120 could potentially be damaged or otherwise crushed between the inner wall of the casing string 114 (FIG. 1) and the conveyance obstruction 412. In another aspect, the control line 120 may potentially damage the conveyance obstruction 412 unless a sufficient standoff distance is facilitated by the relief inserts 402.

Those skilled in the art will readily appreciate the several advantages that the wellbore tape 122 may provide. The wellbore tape 122 encompasses a quick and efficient means of attaching the control line 120 to the conveyance 118 and may be manufactured and installed to a desired strength and height to protect the control line 120 from abrasion during run-in operations. As discussed above, the wellbore tape 122 may be constructed of materials exhibiting sufficient strength and a suitable adhesive to maintain the integrity of the wrap. Use of the wellbore tape 122 eliminates the need for multiple control line connectors of multiple sizes designed for a particular job or set of control lines 120, thereby simplifying the process of attaching control lines 120 to conveyances 118.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A well system, comprising:
   a conveyance extendable into a wellbore;
   at least one control line extending externally to the conveyance; and
   a length of wellbore tape extended around an outer circumference of the conveyance at an axial location and attaching the at least one control line thereto, the wellbore tape including a substrate having a front surface with a plurality of wear-resistant coating strips laterally disposed on at least a portion thereof, wherein the plurality of wear-resistant coating strips include a plurality of ceramic tiles bonded to the front surface, wherein each of the plurality of wear-resistant coating strips has a height extending from the substrate, wherein the height of each of the plurality of wear-resistant coating strips and the front surface of the substrate define a plurality of radial gaps therebetween, and wherein at least one of the plurality of radial gaps is aligned with the at least one control line between the wear-resistant coating strips, and the at least one control line is disposed between the conveyance and the substrate, and a back surface with an adhesive layer disposed thereon, and the adhesive layer being configured to affix the substrate to an outer surface of the conveyance and remain adhered to the wellbore conveyance in a wellbore environment, wherein the wellbore tape is affixed to itself at the axial location.

2. The well system of claim 1, further comprising multiple lengths of the wellbore tape, each length of the wellbore tape being configured to secure the control line to the conveyance at corresponding discrete locations along an axial length of the conveyance.

3. The well system of claim 1, wherein the length of wellbore tape is wrapped at least partially around the conveyance at an angle offset from orthogonal to a longitudinal axis of the conveyance.

4. The well system of claim 1, further comprising at least one relief insert arranged between the conveyance and a portion of the wellbore tape, the relief insert providing a channel configured to receive the at least one control line and thereby elevate the at least one control line off of the outer surface of the conveyance.

5. The well system of claim 4, wherein the at least one relief insert comprises opposing ramp portions leading to a top surface that defines the channel, the wellbore tape being configured to contiguously follow up and back down the opposing ramp portions and extend over the top surface to thereby secure the at least one control line within the channel.

6. The well system of claim 4, further comprising a vibration dampener arranged between the relief insert and the outer surface of the control line or the conveyance.

7. The well system of claim 1, wherein the height of each of the strips provides a standoff distance between a casing string and the conveyance.

8. The well system of claim 1, wherein the substrate is made of a material selected from the group consisting of a plastic or polymer, a composite, an elastomer, a woven fabric, and a metal foil.

9. The well system of claim 8, wherein the material is cured by applying at least one of ultraviolet radiation, electron beam radiation, chemical catalysts, or heat to the material.

10. The well system of claim 1, wherein the wear-resistant coating is made of a material selected from the group consisting of a ceramic, an elastomer, a plastic or polymer, a metal, crystalline materials, and glass beads.

11. The well system of claim 1, wherein the adhesive layer comprises an adhesive selected from the group consisting of natural rubber-based adhesives, synthetic rubber-based adhesives, silicone adhesives, polyacrylate adhesives, pressure-sensitive adhesives, solvent-based adhesives, polymer dispersion adhesives, contact adhesives, and reactive adhesives.

12. The well system of claim 1, wherein one or more of the laterally-spaced strips is arranged at an angle offset from orthogonal to at least one edge of the substrate.

13. A method, comprising:
    introducing a wellbore conveyance into a wellbore;
    arranging at least one control line external to the wellbore conveyance; and
    attaching the at least one control line to the wellbore conveyance with a length of wellbore tape extended around an outer circumference of the wellbore conveyance at an axial location, the wellbore tape including a substrate having a front surface with a plurality of wear-resistant coating strips laterally disposed on at least a portion thereof, wherein the plurality of wear-resistant coating strips include a plurality of ceramic tiles bonded to the front surface, wherein each of the plurality of wear-resistant coating strips has a height extending from the substrate, wherein the height of each of the plurality of wear-resistant coating strips and the front surface of the substrate define a plurality of radial gaps therebetween, and wherein at least one of the plurality of radial gaps is aligned with the at least one control line between the wear-resistant coating strips, and the at least one control line is disposed between the wellbore conveyance and the substrate, and a back surface with an adhesive layer disposed thereon, wherein the wellbore tape is affixed to itself at the axial location.

14. The method of claim 13, further comprising attaching the at least one control line to the wellbore conveyance with multiple lengths of the wellbore tape arranged at discrete locations along the wellbore conveyance.

15. The method of claim 13, wherein attaching the at least one control line to the wellbore conveyance comprises wrapping the wellbore tape around the wellbore conveyance at an angle offset from orthogonal to a longitudinal axis of the wellbore conveyance.

16. The method of claim 13, further comprising elevating the at least one control line off of an outer surface of the wellbore conveyance using at least one relief insert arranged between the wellbore conveyance and a portion of the wellbore tape, the relief insert providing a channel configured to receive the at least one control line.

17. The method of claim 16, further comprising reducing vibrations transmitted to the at least control line from the wellbore conveyance with a vibration dampener arranged between the relief insert and the outer surface of the wellbore conveyance or the control line.

\* \* \* \* \*